March 15, 1932.  W. F. MacGREGOR  1,849,306
WINDROW HARVESTER
Filed May 5, 1928   2 Sheets-Sheet 1
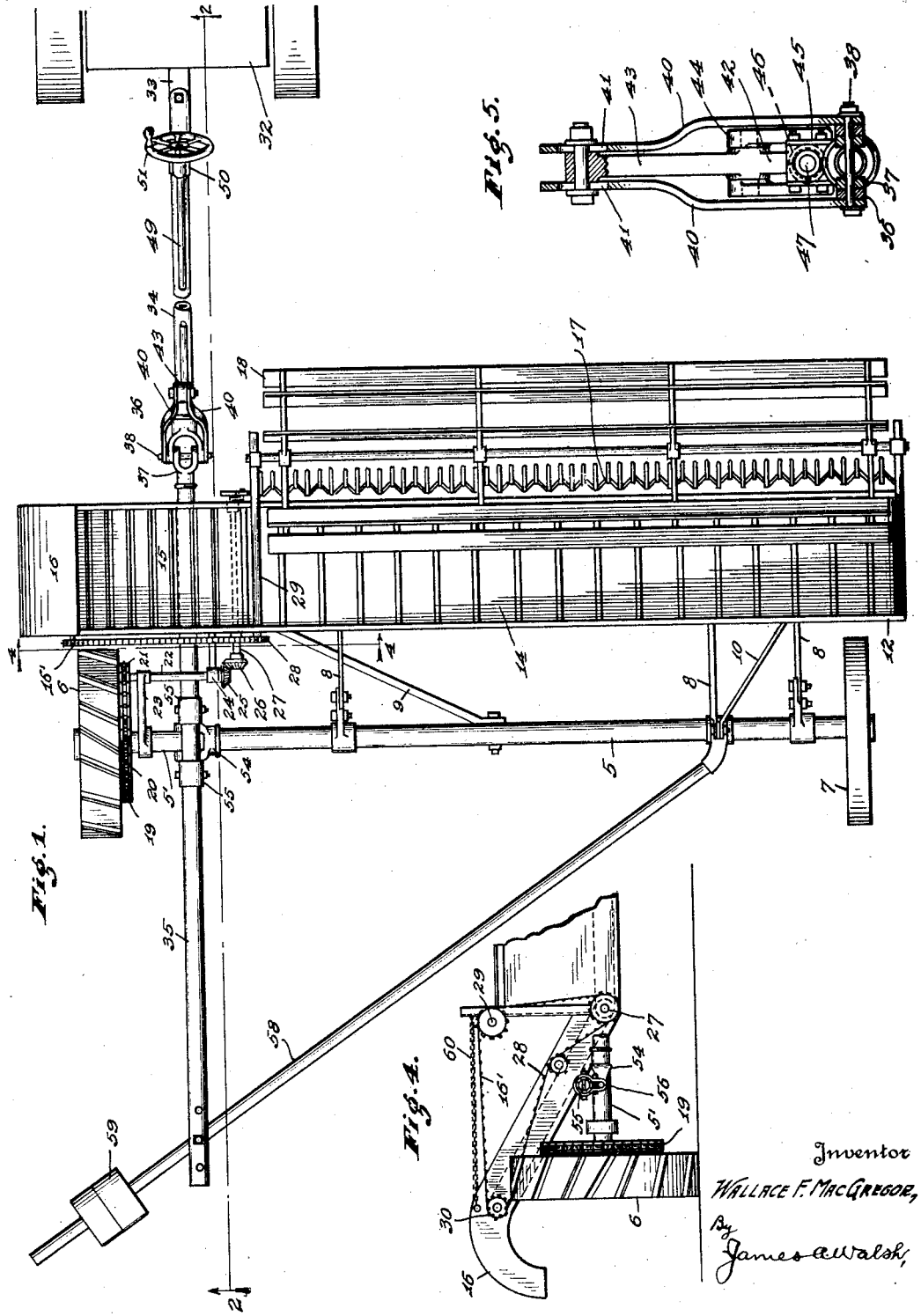
Inventor
WALLACE F. MACGREGOR,
By James A. Walsh,
Attorney

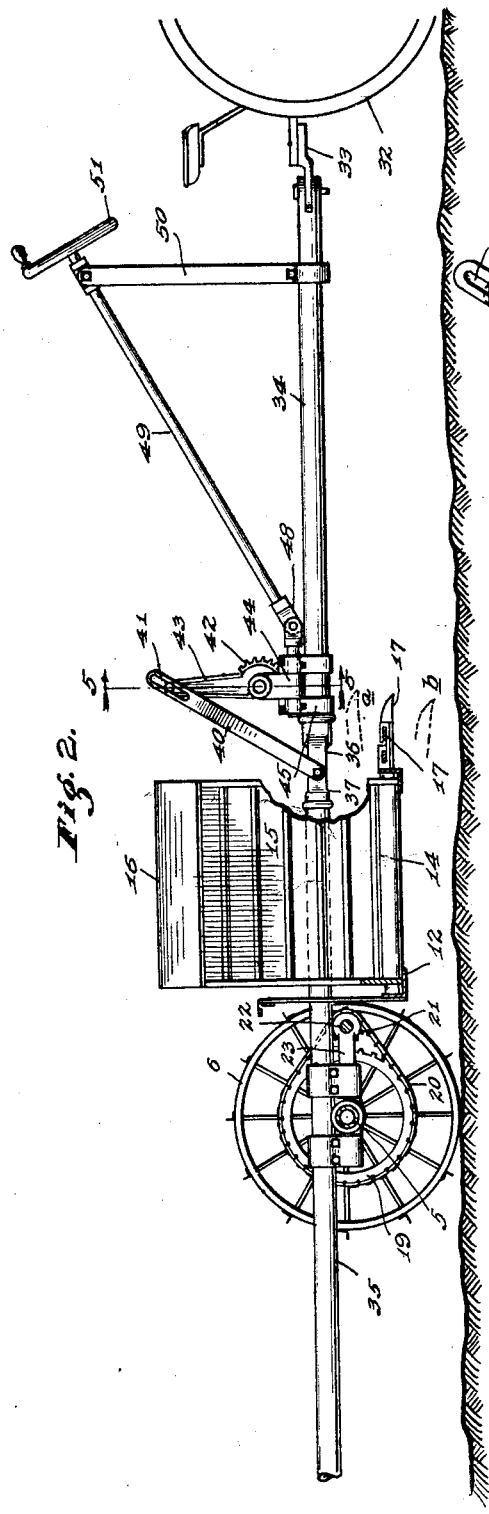

Patented Mar. 15, 1932

1,849,306

UNITED STATES PATENT OFFICE

WALLACE F. MacGREGOR, OF RACINE, WISCONSIN, ASSIGNOR TO J. I. CASE COMPANY, OF RACINE, WISCONSIN, A CORPORATION

WINDROW HARVESTER

Application filed May 5, 1928. Serial No. 275,408.

In the development of combination harvester-thrashers and the methods of harvesting grain thereby it has become the practice in some localities, because of climatic conditions, to cut and arrange the grain in windrows to remain undisturbed until sufficiently dried and ripened for gathering and thrashing, instead of simultaneously threshing and cutting the grain as is done under conditions favorable for such method. It is my object, therefore, to provide a side delivery harvester of comparatively simple construction and operation for cutting the grain and depositing the same in windrows upon the stubble in the path of travel of the machine, and the cutting instrumentalities of which may be readily controlled by a tractor operator and adjusted to the height of grain to be cut according to its growth and irregular soil conditions. When a crop so cut is in condition for thrashing it is the practice to employ a machine with pick-up devices, traveling in the direction taken by the harvester, which will readily project such devices under the windrow and lift the cut grain from the stubble to be conveyed into a complementary thrasher and separated and saved thereby, and by which method timely advantage can be taken of weather conditions to harvest the crop.

In the accompanying drawings, forming part hereof, Figure 1 is a plan of a windrow harvester embodying my improvements; Fig. 2, a detail taken on the dotted line 2—2 in Fig. 1; Fig. 3, a side view of the harvester controlling mechanism, indicating its range of movement; Fig. 4, a detail on the line 4—4 of Fig. 1, showing the conveyer for delivering the cut grain from the header and depositing the same upon the stubble; and Fig. 5 is a detail taken on the dotted line 5—5 in Fig. 2.

In the drawings, the numeral 5 indicates an axle carrying a bull-wheel, 6, in which the axle rocks, and a grain-wheel, 7. The axle 5 is provided with arms, 8, and braces 9, 10, for supporting a header frame, 12. Upon the header frame I mount an endless carrier, 14, of any suitable construction, the delivery end of which, as indicated in Fig. 1, communicates with a conveyer, 15, preferably embodying a deflector, 16, driven by a sprocket-and-chain system, 16', as indicated in Fig. 4. A cutter-bar, 17, as is common, extends along the front side of the carrier 14, and the header frame is also equipped with a reel, 18, for deflecting the grain to be cut, in a well known manner. The power or bull-wheel 6 is provided with a sprocket-wheel, 19, which is connected by a chain, 20, to a sprocket, 21, on the shaft, 22, the latter being connected to the axle 5 by a supporting arm, 23, and is further supported by the bracket, 24, forming part of the header frame, but it will be understood that other driving mechanism may be employed. Said shaft 22 carries a bevel-gear, 25, engaging a gear, 26, on shaft 27, for actuating the sickle in the cutter-bar 17, the sprocket-and-chain system, 28, connecting said shaft 27 and the shaft 29 for rotating the reel, and also the outer roll 30 of the conveyer 16.

My improved windrow harvester is especially adapted for use with and is driven by a tractor, as 32, to the draw-bar, 33, of which I connect a flexible header controller, preferably comprising two sections 34, 35, (Fig. 3) joined by yokes 36, 37, and a pin, 38, Fig. 1, or in any other suitable manner, to permit a hinging movement of the sections, as indicated in Fig. 3. To the pin 38 I connect a pair of arms, 40, having slots 41, therein, between which arms I pivotally mount a segmental rack, 42, having its arm or member, 43, slidably positioned in the slots 41, the rack member 42 being supported in a bracket, 44, which in turn is secured to controller section 34. Beneath rack 42 are hangers, 45, in which a worm, 46, is supported, the shaft 47 whereof is connected by a universal coupling, 48, to rod, 49, the latter in turn being supported by a standard, 50, and provided with a tiller-wheel, 51, within convenient reach of a tractor operator.

In a heavy machine of the character described it is of material advantage and importance to so balance the same that the header may be adjusted to the height of grain to be cut with minimum effort, and in carrying out its construction I prefer to extend the power wheel 6 a considerable distance beyond the delivery end of the header, and this is accomplished by securing to the axle 5 a stub-axle, 5', by a coupling, 54, which will permit the axle and stub-axle to rock together as one. At each side of said coupling are sleeves, 55, through which the controller section 35 is passed, the lower portion of the sleeves and the coupling 54 (Fig. 3) being connected by a removable pin, 56, which may be readily withdrawn or replaced for detaching and connecting the section 35 in relation to the axle 5, whereby the machine may be quickly and in a simple manner assembled or disassembled for operativeness or dismantling. The section 35 is extended rearwardly and connected to a counterbalance arm, 58, supported by the axle 5. The weight 59 on said arm is positioned on the delivering side of the harvester in approximate alinement with or beyond the bull-wheel, in order to increase the weight on said wheel so that the machine will be sensitively balanced and its line of draft coincident with the pull of the tractor in advance of the machine, the weight being thus properly distributed to obviate side draft, and as the delivery end of the conveyer 16 extends beyond the bull-wheel the material discharging from the header through said conveyer is distributed in windrow formation upon the stubble a considerable distance in excess of the swath being cut, thus providing ample room between a windrow and uncut grain for the tractor on each succeeding round of the machine.

As the machine traverses the field the header is readily adjusted to the height of cut by the tractor operator, who manipulates the tiller-wheel 51 to rotate the worm 46, which in turn actuates the rack 42, causing the segment member of arm 43 to travel in the slots 41 to break the joint connecting the controller sections 34, 35, as indicated in Fig. 3, so that as the section 35 is adjusted to the position $a$, Fig. 3, the cutter-bar 17 will be raised accordingly to the position indicated at $a$ in Fig. 2, and when said section is adjusted to the position $b$, Fig. 3, the cutter-bar will be moved to the position $b$ indicated in Fig. 2, so that by manipulating said tiller-wheel the cutter-bar may be raised or lowered through a considerable range of movement according to the height of grain to be cut and the unevenness of the soil over which the machine travels. In thus adjusting the controller 34, 35, it will be understood that the weighted arm 58 will counterbalance the weight of the header through the rocking action of the axle 5, and that but very slight effort in turning the tiller-wheel in reverse direction will tilt the header upwardly or downwardly, as the counterbalancing device in connection with the rocking axle 5 permits a sensitive response to the slightest vertical swing of the controller 34, 35. It will therefore be seen that in the manner described my improved machine is capable of traveling and at the same time so adjustable by means within convenient reach of a tractor operator as to cut grain of varying heights in irregular soil conditions, and by the counterbalance employed (or its equivalent) and the jointed controller the header and its associated parts are readily adjustable to varying soil and crop conditions with a minimum of effort on the part of an attendant stationed upon a tractor or otherwise.

In the operation of my improved windrow harvester the machine is drawn through the standing grain, and the header mechanisms operated by power from the bull-wheel substantially as described, the reel 18 deflecting the stalks over the cutter-bar to be cut, which cut stalks fall upon the carrier 14 and are carried thereby to the conveyer 16 and discharged upon the stubble beyond the bull-wheel, the conveyer being supported by a chain 60. During the cutting operations it frequently becomes necessary to raise and lower the header, and this can be conveniently accomplished by the tractor operator, who, by manipulating the tiller-wheel 51, breaks the jointed controller 34, 35, into the positions substantially as indicated in Fig. 3 when raising and lowering the header, which movements rock the axle 5 rotatably mounted in bull-wheel 6, and as the header frame, axle, controller and counterbalance are all rigidly connected, it will be understood that such movement of the controller readily rocks the axle to adjust the header with but slight manual effort.

I have illustrated and described a complete windrow harvester embodying my improvements, but desire to be understood that where a combination harvester-thrasher is already in use the header element of the machine may be disconnected therefrom and readily utilized for windrow harvesting by attaching thereto my improved header controller, so that it is but necessary to obtain and attach the controller equipment to convert harvesters or headers of known type into windrow harvesters and thus obviate the expense of a specially constructed complete harvester for windrow cutting, and, as will be understood, the controller devices may be detached and the header connected to the thrasher when it is desired to use the combined thrasher and harvester in the regular way.

From the foregoing it will be apparent that by my improvements standing grain can be cut and readily assembled, deposited upon and supported by the stubble in windrow formation at a considerable height from the soil. The headed grain, therefore, will be fully exposed to the sun and wind, and as the cut stalks are not in proximity to the soil to become affected by moisture therefrom, and provided with an abundance of air space, the process of drying and ripening will be materially hastened.

I claim as my invention:

1. In a windrow harvester, a header adjuster comprising members hingedly connected, arms connected to the members, a segmental rack mounted on the adjuster and slidably connected to the arms, a worm engaging the rack, and means for actuating the worm whereby the rack and said arms will hinge the members to adjust a header to the height of grain to be cut.

2. In a windrow harvester, the combination of an axle, wheels connected thereto, a header supported by the axle, means for actuating the operating members of the header, a conveyer for receiving cut grain from the header and distributing the same, a controller connected to the axle, means on the controller for actuating the latter to rock said axle and adjust the header to the height of grain to be cut, and a weighted arm extended rearwardly from the axle and having its weight positioned in approximate alinement with one of said wheels for counterbalancing the weight of the header.

3. In a windrow harvester, an axle, a grain-wheel on the axle, a power-wheel on the axle, a side delivery header supported by the axle, means associated with the power-wheel for actuating the header operating mechanisms, a conveyer for receiving cut grain from the header and discharging the same beyond the power-wheel, a controller connected to the axle for rocking the latter to adjust the header to the height of grain to be cut, and means extending rearwardly from the axle having a weight positioned in approximate alinement with the power wheel for counterbalancing the weight of the header.

4. In a windrow harvester, an axle, a grain-wheel on the axle, a power-wheel on the axle, a side delivery header supported by the axle, means associated with the power-wheel for actuating the header operating mechanisms, a conveyer for receiving cut grain from the header discharging the same beyond the power-wheel, and a controller connected to the axle for rocking the latter to adjust the header to the height of grain to be cut, and means connecting the axle and controller and having its weight in approximate alinement with the power wheel for counterbalancing the weight of the header.

5. In a windrow harvester, a header adjuster comprising two members, means for pivotally connecting the members, arms supported by said pivotal means, a rack movably connected to the arms, and means on the adjuster for actuating the rack whereby the same and said arms will hinge the members to vertically adjust a header to the height of grain to be cut.

6. In a windrow harvester, an axle, a controller comprising hinged members one of which is connected to the axle and the other to a vehicle, means connected to the members whereby they may be hinged in vertical direction to rock said axle, manually operable means for actuating said connecting means to hinge said members, and means extending rearwardly from the harvester and having a weight positioned beyond the controller for counterbalancing the weight of the harvester.

7. In a windrow harvester, an axle, wheels mounted thereon, a header supported by the axle, a controller detachably connected to the axle and extending forwardly and rearwardly therefrom, a counterbalance connecting the axle and controller and having its weight in approximate alinement with one of said wheels, and means for actuating the controller to rock the axle and adjust the header to the height of grain to be cut.

8. In a windrow harvester, an axle, an extension axle connected thereto, wheels mounted on said axle members, a header supported by the axle, a controller for adjusting the header, a sleeve on the controller, a pin connecting the sleeve and axle extension, and means for actuating the controller to rock the axle and its extension for adjusting the header to the height of grain to be cut.

9. In a windrow harvester, the combination, of a header for cutting grain, means for conveying grain from the header, means for supporting the header, a ground driven power wheel on said supporting means, means for adjusting the header vertically for cutting grain of varying heights, and weighted means positioned on the delivering side of the harvester in approximate alinement with said power wheel for counterbalancing the weight of the harvester.

10. In a windrow harvester, the combination, of a header for cutting grain, means for conveying grain from the header, a ground driven power wheel supporting one end of the header and actuating the operating mechanisms thereof, and a counterbalance weight on the delivering side of the harvester in approximate alinement with the power wheel for distributing the weight of and balancing the harvester on said wheel.

11. In a windrow harvester, an axle, a power-wheel secured thereto, a header connected to the axle, means connecting the power-wheel and header for actuating the operating mechanisms of the latter, an adjuster for raising and lowering the header comprising a hinged element projecting forwardly and rearwardly of the header and detachably connected to said axle, means adjacent the hinged connection of said element for hinging the latter in vertical directions, means connected to said latter means and under control of a tractor operator for actuating said hinged means, and means extending from the rear of the header and having a weight thereon positioned in approximate alinement with said power wheel for counterbalancing the weight of the header.

12. In a tractor drawn windrow harvester, an axle, wheels on the axle, a header supported by the axle in advance of the wheels, means connecting one of the wheels and header for actuating the operating mechanisms of the latter, means under control of a tractor operator for adjusting the header to the height of grain to be cut, and counterbalancing means in the rear of the axle and in alinement with one of the wheels for counterbalancing the weight of the header.

13. In a tractor drawn windrow harvester, a rocking axle, a ground driven power wheel on the axle, a grain wheel on the axle, a header supported by the axle in advance of said wheels, means connecting the power wheel and header for actuating the operating mechanisms of the latter, means under control of a tractor operator for adjusting the header vertically for cutting grain of varying heights, and counterbalancing means embodying a weight positioned rearwardly of the axle for balancing the header.

14. In a windrow harvester, a rocking axle, a ground driven power wheel at one end of the axle, a grain wheel at the opposite end of the axle, a header on the axle and extending forwardly thereof, means secured to the axle and adapted to be connected to a tractor for drawing the harvester, means connecting the power wheel to the header for actuating the operating mechanisms thereof, means under control of the tractor operator for vertically adjusting the header, and a counterbalancing weight positioned rearwardly in relation to the header and having its weight in approximate alinement with said power wheel for balancing the header on said rocking axle.

In testimony whereof I affix my signature.

WALLACE F. MacGREGOR.